US007187567B2

(12) United States Patent
Westcott

(10) Patent No.: US 7,187,567 B2
(45) Date of Patent: Mar. 6, 2007

(54) OPERATION OF A CURRENT CONTROLLER

(75) Inventor: Andrew M G Westcott, Great Baddow (GB)

(73) Assignee: Bae Systems plc, London (GB)

( * ) Notice: Subject to any disclaimer, the term of this patent is extended or adjusted under 35 U.S.C. 154(b) by 0 days.

(21) Appl. No.: 10/500,639

(22) PCT Filed: Dec. 17, 2002

(86) PCT No.: PCT/GB02/05732

§ 371 (c)(1),
(2), (4) Date: Jul. 2, 2004

(87) PCT Pub. No.: WO03/056580

PCT Pub. Date: Jul. 10, 2003

(65) Prior Publication Data

US 2005/0078496 A1 Apr. 14, 2005

(30) Foreign Application Priority Data

Jan. 2, 2002 (GB) ................................ 0200027.1

(51) Int. Cl.
*H02M 7/5387* (2006.01)

(52) U.S. Cl. .......................... 363/132; 363/41; 363/98

(58) Field of Classification Search .................. 363/17, 363/40, 41, 42, 43, 98, 132

See application file for complete search history.

(56) References Cited

U.S. PATENT DOCUMENTS 4,585,986 A 4/1986 Dyer
4,768,141 A 8/1988 Hubertus et al.
4,851,739 A * 7/1989 Nilssen ....................... 363/132
4,890,188 A 12/1989 Russell et al.
5,559,467 A 9/1996 Smedley (Continued)

FOREIGN PATENT DOCUMENTS

DE 36 38 174 A1 5/1988

(Continued)

OTHER PUBLICATIONS

I. Toru, Patent Abstracts of Japan, vol. 2000, No. 24, May 2001, (JP 2001-182593).

(Continued)

*Primary Examiner*—Jessica Han
(74) *Attorney, Agent, or Firm*—Nixon & Vanderhye P.C.

(57) ABSTRACT

This invention relates to a method of operating a bridge circuit comprising an input that receives a DC signal of voltage $+V_S$, an output having an electromagnet connected thereacross, first and second arms having first and second switches respectively and being connected to opposed ends of the electromagnet. The method comprises the steps of receiving a voltage demand signal indicative of a desired voltage to be supplied to the electromagnet in a period and generating first and second switching signals with reference to the voltage demand signal. The first and second switching signals are then applied to the first and second switches respectively during the period thereby causing the switches to switch between on and off states to produce voltages across the electromagnet pulsed at levels of $+V_S$, 0V and $-V_S$, such that the average voltage across the electromagnet during the period is substantially equal to the desired voltage.

28 Claims, 6 Drawing Sheets

U.S. PATENT DOCUMENTS

| | | | | |
|---|---|---|---|---|
| 5,729,422 | A | 3/1998 | Henke | |
| 5,847,554 | A | 12/1998 | Wilcox et al. | |
| 5,952,856 | A * | 9/1999 | Horiguchi et al. | 363/98 |
| 5,953,322 | A | 9/1999 | Kimball | |
| 5,977,725 | A | 11/1999 | Miyazaki et al. | |
| 6,194,883 | B1 | 2/2001 | Shimamori | |
| 6,213,442 | B1 | 4/2001 | Ivers et al. | |
| 6,316,895 | B1 | 11/2001 | Ramarathnam | |
| 2001/0015969 | A1 | 8/2001 | Sicher et al. | |
| 2001/0030955 | A1 | 10/2001 | Lee et al. | |
| 2001/0036172 | A1 | 11/2001 | Haskal | |
| 2001/0039197 | A1 | 11/2001 | Barkan | |
| 2002/0059449 | A1 | 5/2002 | Wandel et al. | |
| 2002/0071396 | A1 | 6/2002 | Lee et al. | |
| 2002/0075824 | A1 | 6/2002 | Willekes et al. | |

FOREIGN PATENT DOCUMENTS

| | | |
|---|---|---|
| DE | 40 18 930 A1 | 1/1992 |
| DE | 44 13 240 | 10/1995 |
| DE | 197 28 318 C1 | 4/1999 |
| DE | 197 47 033 A1 | 4/1999 |
| EP | 0 150 492 | 12/1984 |
| EP | 0 443 032 | 8/1991 |
| EP | 0 760 552 | 3/1997 |
| EP | 1 146 217 | 10/2001 |
| GB | 2 014 388 | 8/1979 |
| GB | 2 084 827 | 4/1982 |
| GB | 2 184 625 | 6/1987 |
| GB | 2 211 680 | 7/1989 |
| JP | 1-109707 | 4/1989 |
| JP | 1-247507 | 10/1989 |
| JP | 7-103324 | 4/1995 |
| JP | 10-96480 | 4/1998 |
| JP | 10-149888 | 6/1998 |
| WO | WO 93/07637 | 4/1993 |
| WO | WO 98/39787 | 9/1998 |
| WO | WO 00/74222 | 12/2000 |
| WO | WO 01/52294 | 7/2001 |

OTHER PUBLICATIONS

M. Tetsuro, Patent Abstracts of Japan, vol. 2000, No. 25, Apr. 2001, (JP 2001-217122).

S. Hiroshi, Patent Abstracts of Japan, vol. 18, No. 343, Jun. 1994, (JP 06-083402).

M. Miyokazu, Patent Abtracts of Japan, vol. 1999, No. 8, Jun. 1999, (JP 11-069629).

* cited by examiner

OPERATION OF A CURRENT CONTROLLER

This application is the U.S. national phase of international application PCT/GB02/05732 filed in English on 17 Dec. 2002, which designated the U.S. PCT/GB02/05732 claims priority to GB Application No. 0200027.1 filed 02 Jan. 2002. The entire contents of these applications are incorporated herein by reference.

This invention relates to a method of operating a bridge circuit of a current controller that produces current flowing through an electromagnet, the bridge circuit being operated to generate an output signal that produces a desired force from an electromagnet connected across the output of the bridge circuit.

A presently contemplated application of the present invention is in driving an electromagnet used to isolate vibrations in a mechanical structure. For example, an array of electromagnets may be used to create an array of forces that levitates a raft supporting moving machinery. The moving parts of the machinery are likely to cause vibrations and flexing of the supporting raft that would be transmitted to the raft's supporting structure. Levitating the raft using the forces provided by the array of electromagnets will isolate the supporting structure from the vibrations provided the raft remains levitated out of contact from the supporting structure at all times and provided the forces exerted by the electromagnets are controlled by obeying certain rules. Essentially, the electromagnets work to reduce the vibratory resonances of the raft by producing forces to oppose the resonant motions of the raft. The required forces produced by each electromagnet are controlled by varying the current passing through each electromagnet with a current controller.

The current controller may be operated in response to current demands or it may also operate in response to voltage demands because control of either affects the force produced by the electromagnet. In addition, the current controller can be operated in response to force demands. Even where the current controller is operated in voltage demand mode with demanded voltages being set across the electromagnet, this will of course influence the current flowing through the electromagnet and so the term 'current controller' is used to cover operation in response to voltage or current or field demands.

Where the current controller is operated in voltage demand mode, high-frequency voltage pulses may be applied to the electromagnet because the large inductance associated with electromagnets leads to a slow response time in the current so that it smoothly follows drifts in the average voltage applied across the electromagnet.

The current/voltage supplied to the electromagnet must be tightly controlled to isolate the resonant vibrations of the raft. This is because any deviation in the required current/voltage will lead to a force being produced that will deviate from that desired to isolate the resonant vibrations. Small deviations away from the relatively large forces required to levitate the raft are critical because they degrade what would ideally be a null transmission of dynamic forces into the supporting structure. One major source of deviations from the required current/voltage is noise in the control signals that operate the current controller and so there is a need for very low noise operation.

A known current controller includes a half-bridge circuit akin to that shown in FIG. 1. As can be seen, the electromagnet is connected across the output of the half-bridge circuit. Control of the current flowing through the electromagnet is achieved by analogue switching of a pair of transistors positioned on opposed arms of the bridge circuit (the other opposed arms containing diodes to complete the half-bridge circuit) to alter the polarity of the voltage across the electromagnet. A reservoir capacitor is included to hold current drawn from the electromagnet that cannot be passed back to the DC supply.

A current or voltage demand will be received and switching signals generated to match this demand. The switching signals are supplied at the points marked A and B to control the transistors such that they are switched between maximum and minimum conducting states (their linear region is not used due to poor power efficiency). The diodes in the half-bridge circuit ensure that current flows in one direction only through the electromagnet, in this case from right to left in FIG. 1. The current controller is operated such that the transistors are switched concurrently: when both transistors are on (i.e. conducting), a voltage of $+V_S$ is applied across the electromagnet and when the transistors are off (i.e. non-conducting), a voltage of $-V_S$ is applied across the electromagnet. The duty cycles at $+V_S$ and $-V_S$ determine the average current delivered to the electromagnet, remembering that the inductance of the electromagnet ensures that the current smoothly follows the voltage rather than sharply jumping with each voltage pulse. Hence, by switching the transistors at appropriate times, the desired current can be delivered to the electromagnet.

The pulsed voltage signal that produces these duty cycles is implemented using pulsed switching signals supplied to the transistors. The switching signals are modulated according to a pulse width modulation scheme according to an analogue-implemented scheme, such that the width of the pulses within a period are varied so that the pulse at $+V_S$ is varied relative to the remaining time at $-V_S$ to produce the desired current.

However, the noise performance of this known current controller is limited and its performance suffers accordingly.

According to a first aspect, the invention resides in a method of operating a bridge circuit comprising an input that receives a DC signal of voltage $+V_S$, an output having an electromagnet connected thereacross, first and second arms having first and second switches respectively, the first and second arms being connected to opposed ends of the electromagnet, the method comprising the steps of: (a) receiving a voltage demand signal indicative of a desired voltage of an electrical signal to be supplied to the electromagnet in a period; (b) generating first and second switching signals with reference to the voltage demand signal; and (c) applying the first and second switching signals to the first and second switches respectively during the period. The switching signals cause the switches to switch between on and off states, with switching between various combinations of on and off states of the first and second switches producing an electrical signal across the electromagnet with voltage pulses at levels of $+V_S$, 0V and $-V_S$. The first and second switching signals are generated such that an average voltage of the electrical signal supplied to the electromagnet during the period is substantially equal to the desired voltage.

Using pulses at levels of $+V_S$, 0V and $-V_S$ allows an average voltage within the range of $+V_S$ and $-V_S$ to be produced for that period. For example, if a voltage of $0.5V_S$ is desired, then a voltage of $+V_S$ can be applied to the electromagnet for half of the period and a voltage of 0V for the other half.

Control of the voltage applied across the electromagnet also controls the average current flowing through the electromagnet. Accordingly, current and force demands can be accommodated by converting those demands into a corresponding voltage demand that is used to set a corresponding voltage across the electromagnet thereby to generate the required current through the electromagnet or force provided by the electromagnet. The average current flowing through the electromagnet will vary according both to the voltage across the electromagnet, the response of the components of the circuit (e.g. inductance of the electromagnet, capacitance in the circuit) and of the current already flowing through the electromagnet. In general, a voltage of $+V_S$ gives a rapidly-increasing current whilst switching to a voltage of 0V will lead to the current gradually decreasing to zero or negative values whilst switching to $-V_S$ will lead to the current rapidly decreasing to zero or negative values. If a full bridge circuit is used, current can flow both ways through the electromagnet (i.e. positive and negative currents), whilst if a half-bridge circuit is used only unidirectional current flow through the electromagnet is possible.

The voltage seen by the electromagnet depends on the states of the first and second switches as follows. When both switches are on, the electromagnet sees a voltage of $+V_S$. When both switches are off, the electromagnet sees a voltage of $-V_S$. Finally, when one switch is on and the other is off, irrespective of which way round, the electromagnet sees a voltage of 0V.

Using bipolar switching, i.e. switching between three voltage levels $+V_S$, 0V and $-V_S$, gives advantages over the prior art controller that uses unipolar switching, i.e. switching between $+V_S$ and $-V_S$ only. For example, in a digital implementation, an additional one bit of resolution is acquired using bipolar switching for a given timing clock frequency as voltage steps of $V_S$ are possible rather than just the voltage steps of $2V_S$ obtained with unipolar switching. Alternatively, the same resolution can be obtained using only half the timing clock frequency.

Optionally, the method may comprise the step of generating pulsed first and second switching signals. This is advantageous as it allows an all-digital implementation. Using pulsed switching signals means that the voltage produced across the electromagnet is also pulsed, although there will be pulses of $+V_S$ and $-V_S$ relative to the 0V baseline.

Alternatively, a continuously-varying signal could be used with switching of the transistors occurring when the signal exceeds a threshold value. This allows a part-analogue implementation.

Preferably, the method may comprise the step of generating the first and second pulsed switching signals according to a rule that the first and second switches are not switched concurrently. Operating only one switch at a time is advantageous because the voltage steps that occur across the electromagnet may be halved at each switching event. This is particularly advantageous where the voltage step of $2V_S$ that occurs with the prior art current controller may degrade the insulation of the electromagnet and lead to eventual breakdown voltage. Conversely, adopting bipolar switching allows the bridge circuit to be run from a higher voltage DC source without fear of degradation of the insulation upon switching the transistors. Furthermore, the change in pulse waveforms arising from bipolar switching employing an additional intermediary voltage level at 0 V means that the power of unwanted components in the output waveform at harmonics of the pulse repetition frequency is reduced from a fixed high level to a lower level which drops as the signal drops.

The method may comprise the step of generating the first and second switching signals according to a rule that the signals are to have no more than one pulse per period. Advantageously, this minimises the number of times the switches must be switched, thereby reducing power losses.

Preferably, the method may comprise the step of generating the first and second switching signals according to a rule that any pulse should be positioned substantially symmetrically about the centre of the period. This is so-called uniform pulse width modulation and leads to the electromagnet seeing a voltage that is also symmetric about the centre of the period. Other forms of pulse width modulation are possible, such as leading edge or trailing edge pulse width modulation.

Optionally, the method may comprise the step of generating the first and second switching signals according to the rule that where pulses cannot be centred symmetrically, the longer and shorter sides of the asymmetric pulses are alternated between the leading edge side and the trailing edge side for successive asymmetric pulses. For example, where a period extends over an even number of timing clock cycles, a pulse occupying an odd number of clock cycles cannot be created symmetrically within the period: a half-clock cycle must be taken from the leading edge and added to the trailing edge or vice versa. By performing the method herein defined, distortion is suppressed that would otherwise result from adding the offset always to the leading edge or always to the trailing edge side.

Optionally, the method may comprise the step of generating the first and second switching signals according to a pulse width modulation scheme. Modulating the switching sequences to a pulse width modulation (PWM) scheme means that the pulsed voltages seen by the electromagnet are also modulated to a PWM scheme. This is because the voltage seen by the electromagnet steps each time there is a pulse edge in either of the switching signals, hence the edge positions of the switching signals determine the edge positions of the voltage across the electromagnet. The switching signals may have a digital modulation (i.e. to two levels with high and low values corresponding to the switches being on/conducting or off/non-conducting), but the combination of on and off switch states in the bridge results in the three levels of the bipolar PWM voltages seen by the electromagnet.

The method may comprise the step of generating the first and second switching signals according to a rule that the first switching signal should remain in one state throughout a period and the second switching signal contains a pulse such that the first switch remains in one state throughout a period and the second switch is switched between on and off states during the period. This will lead to a period having pulses of solely $+V_S$ and 0 V or solely $-V_S$ and 0 V.

Using this method with transistors as the switches, only one transistor is switched in a period rather than switching both transistors. This is convenient as the biggest power loss in the bridge circuit occurs in switching the transistors. With unipolar switching, there is a power loss in both transistors at each voltage change as they are switched concurrently. Bipolar switching allows just one transistor to be switched within a period thereby halving the power losses over unipolar switching.

As will be appreciated, if a number of positive average voltages are required over consecutive periods, one switch can be left in one state throughout all these periods (the on state, the other switch being switched on and off to give voltages of $+V_S$ and 0V). Similarly, for negative voltages, one switch can be left in an off state and the other switch is switched between on and off states to give voltages of 0V and $-V_S$. It is only where the average voltage crosses through zero that both first and second switches will need to be switched (with one switch needing to be switched at the very start of the next period). This leads to significant reductions in power losses in the bridge circuit.

Use of bipolar switching introduces 'cross-over distortion'. This occurs when a signal of average voltage close to 0V is required. In this case, the required widths of the voltage pulses seen by the electromagnet and hence the pulses of the switching signals tend to zero. Producing very narrow pulses is very difficult due to the slow rise and fall times of the pulse edges and due to ringing in the pulse. The rising edge followed by the ringing top whilst the voltage settles to its final value will be of a substantially fixed width and, similarly, the falling edge will also be of a substantially fixed width. In wider pulses, these effects are mitigated by the relatively long period at the steady voltage. Conversely, where the pulse width is so narrow that there is no time to settle to a steady voltage, control of the average voltage seen by the electromagnet is severely degraded. Hence, at low voltage demands where very narrow pulses are required, the level of distortion is enhanced and this is known as 'cross-over distortion'.

Optionally, the method may comprise the step of generating the first and second switching signals according to a rule that the pulse widths of the resulting voltages across the electromagnet must not fall below a minimum pulse width. Conveniently, this alleviates the cross-over distortion described above. By pulse widths, it should be remembered that the widths are for the pulses at $+V_S$ and $-V_S$ relative to the 0V baseline.

This solution may be implemented by the method comprising the step of generating the first and second switching signals according to a rule that pulse widths below the minimum pulse width are avoided by departing from the rule that one of the first or second switches should remain in one state throughout a period with the other of the first and second switches being switched between on and off states during the period, in favour of a rule that both first and second switches are switched between on and off states during a period.

Operating the primary rule that one switch remains in one state throughout a period and only the other is switched produces pulses of $+V_S$ and 0V or $-V_S$ and 0V only. The secondary rule of switching both first and second switches during a period, although not concurrently, is advantageous when small voltages are required because it generates voltages of $+V_S$ and $-V_S$ relative to a 0V baseline. In this way, a small average positive voltage or small average negative voltage can be generated from a combination of wider $+V_S$ and $-V_S$ pulses that, in turn, can be generated from wider pulses of the first and second switching signals.

Optionally, the method may include the step of adding the width of the pulse added to the second switching signal to the pulse of the first switching signal. In effect, the same with is added to the voltage pulses at $+V_S$ and $-V_S$, such that they cancel to give no net increase in the average voltage across the electromagnet during the period.

Preferably, the width of a pulse of the first and/or second switching signals is generated with reference to a voltage signal indicative of the DC signal such that the width of the pulse compensates for fluctuations in the DC signal. Voltage fluctuations in the DC signal will manifest themselves as a pulse amplitude modulation in the voltage seen by the electromagnet and so the desired voltage will not be met by the average voltage seen by the electromagnet over the period. By adding or subtracting width to/from the pulse or pulses of the first and/or second switching signal, the lost or gained amplitude can be compensated for by adjusting the width of the voltage pulse or pulses seen by the electromagnet.

Optionally, the voltage signal is passed through a filter to obtain a predictive measure of fluctuations in the DC signal. This may alleviate problems in the finite response time in relaying the voltage signal and in generating the switching signals for the successive period. The voltage signal may be passed through a finite impulse response filter.

The width of a pulse of the first or second switching signals may be generated to include an addition in width to compensate for a voltage drop across a diode and/or transistor in the bridge circuit. Conveniently, the addition in width may be calculated with reference to a current signal indicative of the current flowing through the electromagnet and a representative resistance of the diode or transistor. If these voltage drops are not compensated for, the voltage seen by the electromagnet will be less than the desired voltage.

Optionally, the width of a pulse of the first or second switching signals is generated to include additional width to compensate for a voltage offset caused by slow response times in the first or second switch. Slowness in the response of the switches will lead to sloping leading and trailing edges of the pulses seen in the voltage supplied to the electromagnet. Hence, the average voltage supplied to the electromagnet over the period will not match the desired voltage.

Optionally, the method may further comprise the step of noise shaping the first and second switching signals. Advantageously, this noise shaping may be second-order noise shaping.

Preferably, the first and second switches are transistors and the method comprises the step of switching the transistors between on and off states corresponding to substantially maximum and substantially minimum current flow respectively through the transistors. The transistors may be MOSFET transistors, for example.

Optionally, the method may comprise the step of receiving a current demand signal indicative of a desired current to be supplied to the electromagnet in a period and determining the voltage demand signal indicative of a desired voltage of an electrical signal to be applied to the electromagnet that results in the electrical signal being supplied to the electromagnet during the period with a current substantially equal to the desired current. In this way, the current controller may take a current demand and operate by calculating a corresponding voltage demand locally.

Optionally, the step of calculating the voltage demand signal is performed with reference to a model of the load characteristic of the electromagnet. For example, a look-up table may be constructed listing required voltages to generate the desired currents. Alternatively, a polynomial relationship or similar may be derived such that the required voltage can be calculated given a desired current.

Preferably, the step of generating the voltage demand signal may be performed with reference to a current signal indicative of the current flowing through the output. In this way, adjustments may be made to compensate for any difference between the desired current and the actual current measured at the output. One way of achieving this is to calculate the difference between the desired current and actual measured current and subtract this from the current demand signal prior to calculating the voltage demand.

The invention also resides in a computer program comprising program code means for performing the method steps described herein above when the program is run on a computer and/or other processing means associated with the bridge circuit. Furthermore, the invention also resides in a computer program product comprising program code means stored on a computer readable medium for performing the method steps described herein above when the program is run on a computer and/or other processing means associated with the bridge circuit.

From another aspect, the invention also resides in a bridge circuit comprising an input operable to receive a DC signal of voltage $+V_S$, an output having an electromagnet connected thereacross, first and second arms having first and second switches respectively, the first and second arms being connected to opposed ends of the electromagnet and processing means programmed to perform any of the method steps described herein above. The bridge circuit may optionally include any of a voltage signal sensor, a filter (including a finite impulse response filter), a diode and/or transistor, a current signal sensor or a noise shaper.

The invention will now be described, by way of example only, by reference to the accompanying drawings in which.

Figure 2:
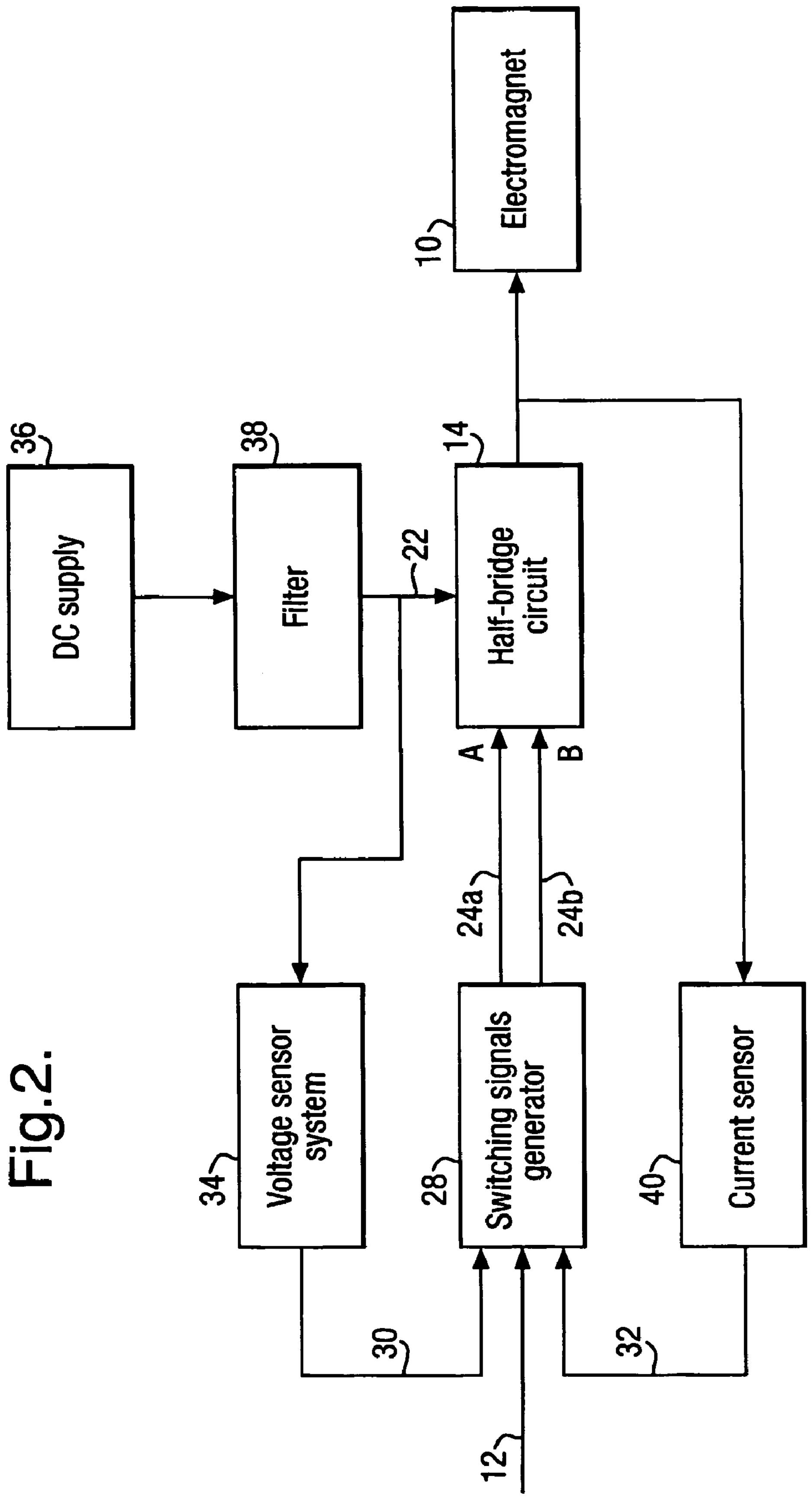
FIG. 2 is a schematic representation of a current controller according to a first embodiment of the present invention.
Figure 3A:
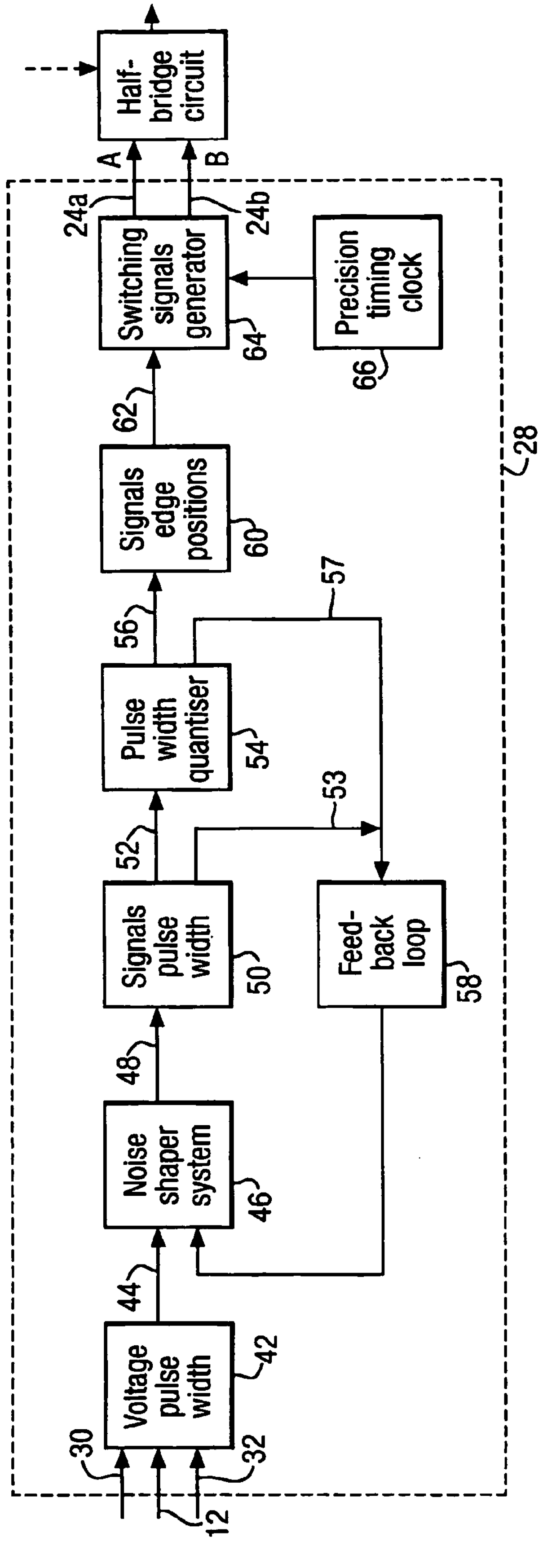
Figure 3B:
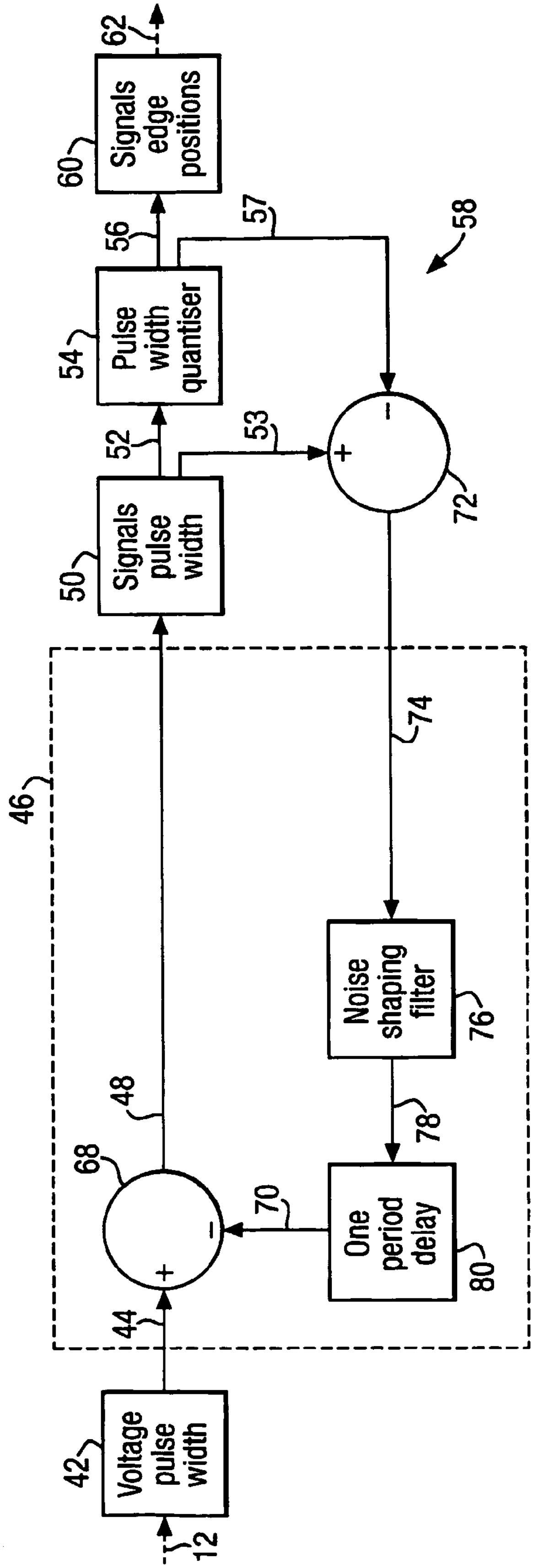

FIG. 3*a* is a schematic representation of the switching signal generator 28 of FIG. 2;

FIG. 3*b* is a schematic representation of the noise shaper 46 of FIG. 3*a;*

Figure 1:
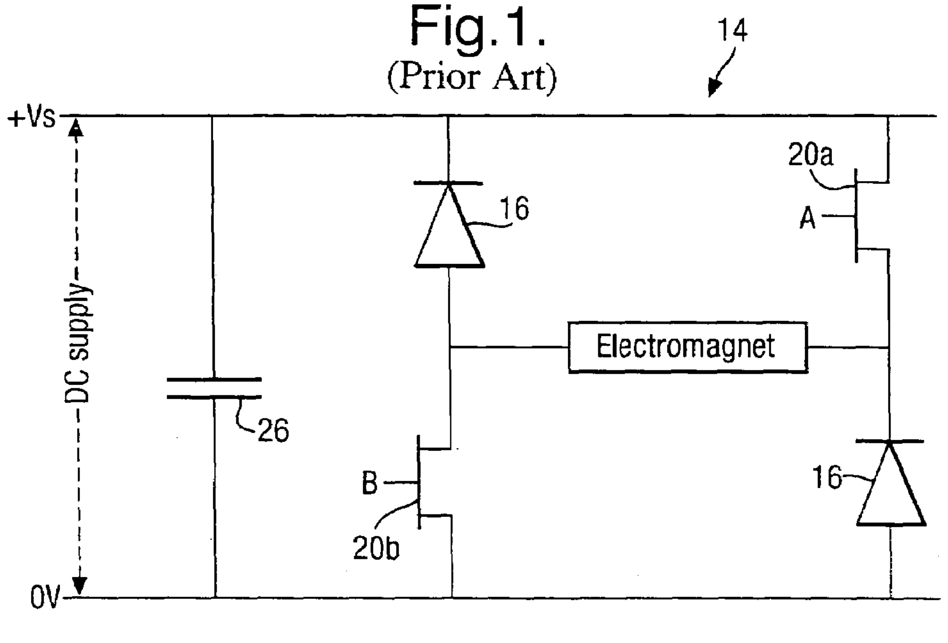
Fig.1. (Prior Art)
FIG. 1 shows a half-bridge circuit 14.
Figure 6:
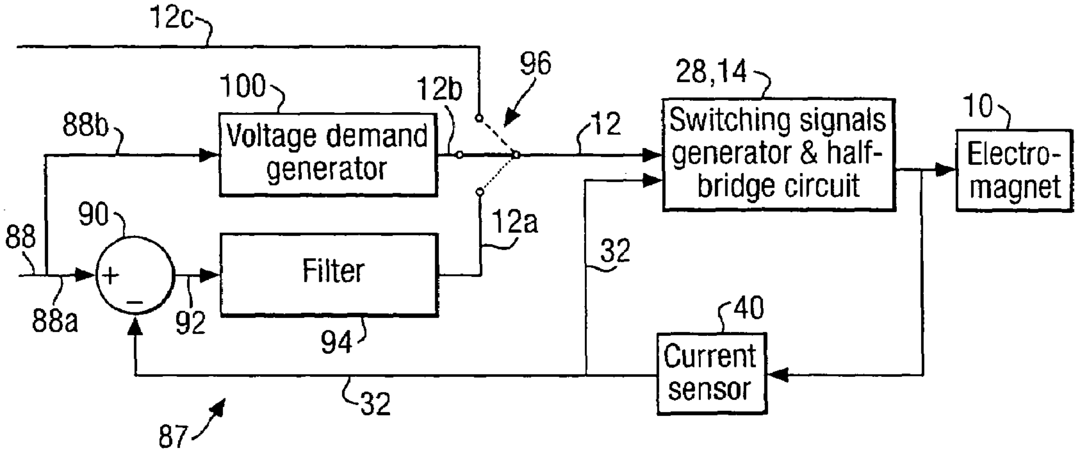
Figure 4:
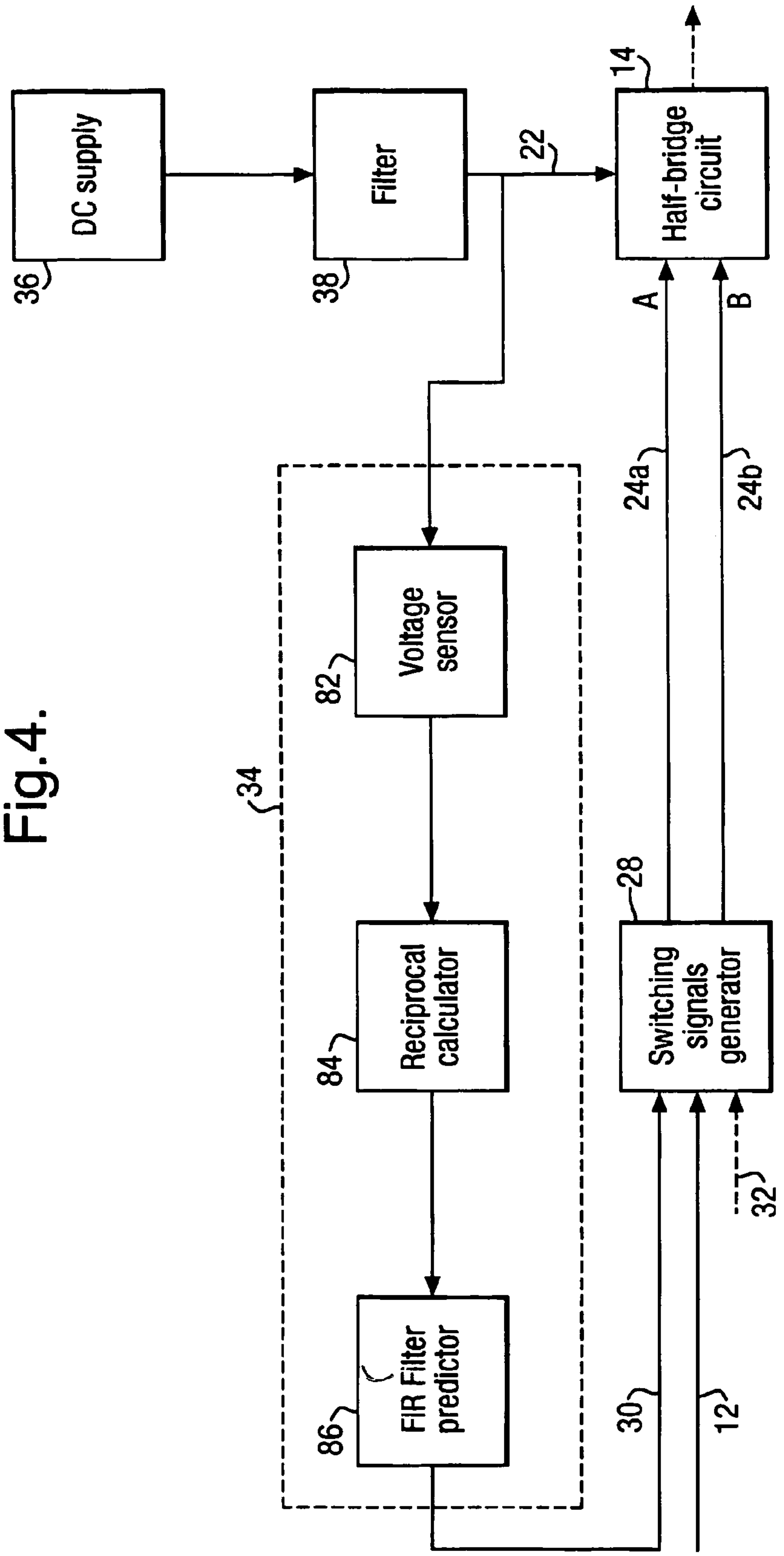

FIG. 4 is a schematic representation of the voltage sensor system 34 of FIG. 2;

FIGS. 5*a–d* shows, for a single period only, switching signals 24*a*, 24*b* for the transistors 20*a*, 20*b* as provided at points A and B of FIG. 1 for four different switching modes and the resultant voltage (labelled as $V_{mag}$ for brevity) seen by the electromagnet 10; and FIG. 6 is a schematic representation of part of a second embodiment of a current controller that can be operated in either voltage demand or current demand mode.

A current controller according to a first embodiment of the invention is illustrated in the schematic sketch of FIG. 2. As will be clear, the current controller supplies current to an electromagnet 10. The electromagnet 10 may, for example, be one of an array of such electromagnets used to levitate a raft supporting moving machinery that is subject to resonant vibrations thereby isolating the resonances from any surrounding structure.

In this embodiment, the current controller supplies current to the electromagnet 10 in response to a voltage demand signal 12. The voltage demand signal 12 is generated in accordance with a desired force to be generated by the electromagnet 10. For example, the voltage demand signal 12 may be generated by a global controller (not shown) that gathers information about the vibrations of the raft supporting the moving machinery from a number of motion sensors over successive periods of time. The global controller may then determine the force that should be generated by each electromagnet 10 to reduce the resonant frequencies during each successive period. Once the force is determined, the global controller may calculate the required voltage to be applied to the electromagnet 10 for each successive period to realise the desired force and supply this to the current controller as the voltage demand signal 12. Alternatively, the global controller could supply a signal indicative of the desired force to the current controller, with the current controller calculating the corresponding voltage demand signal 12 locally.

The current supplied to the electromagnet 10 is regulated by a half-bridge circuit 14 and corresponds to that shown in FIG. 1. The half-bridge circuit 14 comprises a bridge whose opposed arms have a pair of diodes 16 and a pair of transistors 20*a*, 20*b*. The supply input to the half-bridge circuit 14 is supplied with a DC voltage of $+V_S$, obtained as a filtered DC supply 22 as will be described in more detail later. The electromagnet 10 is connected across the output of the half-bridge circuit 14.

Switching signals 24*a*, 24*b* are applied to the transistors 20*a*, 20*b* at points A, B respectively. The transistors may be of the MOSFET type, although other commonly available types are equally employable. The transistors 20*a*, 20*b* are run between on and off states, i.e. between states of minimum and maximum current flow, rather than using the linear region of their conductance where power losses are greater. The switching signals 24*a*, 24*b* control the transistors 20*a*, 20*b* respectively to operate the half-bridge circuit 14 in one of three modes.

In the first mode, both transistors 20*a*, 20*b* are switched ‘on’, i.e. into a conducting state, so that the electromagnet 10 sees a voltage of $+V_S$ and current flows through the electromagnet 10 in a forward path from transistor 20*a* to transistor 20*b*, i.e. from right to left.

In the second mode, one of the transistors 20*a*, 20*b* is switched ‘on’ and the other is switched ‘off’, i.e. into a non-conducting state. As will be readily apparent, in this mode the electromagnet 10 sees a voltage of 0V and current can only flow through one loop of the half-bridge circuit 14. When transistor 20*a* is switched on and transistor 20*b* is switched off, current flows in the upper loop of the half-bridge circuit 14 shown in FIG. 1. Conversely, when transistor 20*b* is switched on and transistor 20*a* is switched off, current flows through the lower loop of the half-bridge circuit 14 of FIG. 1. However, irrespective of which transistor 20*a*, 20*b* is on and which is off, current always flows through the electromagnet 10 from right to left: this current will drop in magnitude according to the resistive losses in the current path.

Finally, in the third mode both transistors 20*a*, 20*b* are switched off. The reservoir capacitor 26 connected across the filtered DC supply 22 and the large inductance of the electromagnet 10 ensures current flows through the electromagnet 10 along a reverse path through both diodes 16. Accordingly, the electromagnet 10 sees a voltage of $-V_S$ and, again, current flows through the electromagnet 10 from right to left. This current flow will diminish in magnitude as the reservoir capacitor 26 discharges through resistive losses.

It will be appreciated that the above arrangement leads to unidirectional current flow through the electromagnet 10. Furthermore, it will be evident that this current flow may be controlled by supplying suitable switching signals 24*a*, 24*b* to transistors 20*a*, 20*b* respectively thereby to set voltages of $+V_S$, 0V or $-V_S$ across the electromagnet 10.

The switching signals 24*a*, 24*b* for each successive period of time are generated by a switching signals generator system 28 operable in response to the voltage demand signal 12. The average current flowing through the electromagnet 10 during any one period may be varied by altering the duty cycles at each of the voltage levels $+V_S$, 0V or $-V_S$ during the period. A maximum increase in current flow will correspond to a voltage of $+V_S$ being set throughout a period and a maximum decrease in current flow will correspond to a voltage of $-V_S$ being set throughout a period.

In addition to generating the switching signals 24*a*, 24*b* in response to the voltage demand signal 12, the switching signals generator system 28 may also take account of two further signals when generating the appropriate switching signals 24*a*, 24*b*. These signals are a voltage sensor signal 30 and a current sensor signal 32. The voltage sensor signal 30 is a predictive measure of voltage fluctuations in the filtered DC supply 22 provided at the input of the half-bridge circuit 14. The voltage sensor signal 30 is generated by a voltage sensor system 34 that measures fluctuations in the voltage supplied by a DC supply 36 after it has passed through a filter 38 as will be described in more detail below. Turning now to the current sensor signal 32, this signal 32 is generated by a current sensor 40 that measures the current produced by the half-bridge circuit 14 that flows through the electromagnet 10 as will be described in more detail below. Essentially, the current sensor signal 32 is used by the switching signals generator system 28 to account for voltage drops in the transistors 20*a*, 20*b* and slow rise and fall times in the voltage pulses seen by the electromagnet 10 due to its capacitance.

Although it is not essential for the switching signals generator system 28 to generate the switching signals 24*a*, 24*b* with regard to the voltage sensor signal 30 or the current sensor signal 32, far better noise control can be achieved if it is as will become evident below.

The elements of the switching signals generator system 28 will now be described in more detail. As can be seen most clearly from FIG. 3*a*, the voltage demand signal 12, the voltage sensor signal 30 and the current sensor signal 32 are passed to a voltage pulse width generator 42. The voltage pulse width generator 42 calculates the required voltage pulse width 44 for the period to match the voltage demand signal 12 for that period, compensating for any predicted voltage fluctuations in the filtered DC supply 22 by reference to the voltage sensor signal 30 and for any voltage drops in the half-bridge circuit 14 by reference to the current sensor signal 32. For example, if the voltage demand signal 12 demands a voltage of $\frac{1}{2}V_S$ for the period, the voltage pulse width generator 42 will generate a pulse of $+V_S$ to occupy half the period, the other half of the period being set to 0V.

The calculated voltage pulse width 44 is then passed to a noise shaper 46 where quantisation noise in the signal is shaped such that noise is suppressed at the frequencies of interest at the expense of increased noise at higher frequencies. The noise shaper 46 is shown in more detail in FIG. 3*b* and will be discussed in greater detail below.

After noise shaping, the resulting voltage pulse width 48 is then passed to a switching signals pulse width generator 50 that calculates the pulse widths for each of the switching signals 24*a*, 24*b* passed to the transistors 20*a*, 20*b*. These switching signal pulse widths 52 are set to correspond to the noise shaped voltage pulse width 48 passed on by the noise shaper 46. The switching signal pulse widths 52 are calculated with respect to the current sensor signal 32 (carried through from the voltage pulse width generator 42 and the noise shaper 46) to compensate for slow rise and fall times in the voltage across the electromagnet 10 following switching of the transistors 20*a*, 20*b*. In addition, the switching signal pulse widths 52 are combined to give the compensated voltage pulse width 53.

Now that the switching signals' pulse widths 52 are known, they are passed on to a pulse width quantiser 54 to have the required width matched to the nearest available quantised level within the bit resolution of the quantising scheme. The quantised switching signals pulse widths 56 are used to calculate the corresponding quantised voltage pulse width 57, which will differ from the compensated voltage pulse width 53 within the limits of quantisation. The differences between the switching signals pulse widths 52 and the quantised switching signals pulse widths 56 and the compensated voltage pulse width 53 and the quantised voltage pulse width 57 are, of course, quantisation errors and they manifest themselves as quantisation noise. The compensated voltage pulse width 53 and the quantised voltage pulse width 57 are sent back through a feedback loop 58 to the noise shaper 46 such that the quantisation noise is reduced.

The quantised switching signals pulse widths 56 are then passed to a switching signals edge position generator 60 that calculates the appropriate edge positions for the switching signals 24*a*, 24*b*. The calculated switching signals edge positions 62 are then converted to the actual switching signals 24*a*, 24*b* by a switching signals generator 64 with reference to a precision timing clock 66 thereby ensuring accuracy and synchronisation. Finally, the switching signals 24*a*, 24*b* are passed to the transistors 20*a*, 20*b* respectively at points A and B of FIG. 1 respectively. Operation of the transistors 20*a*, 20*b* causes the voltage across the electromagnet 10 to vary between the values of $+V_S$, 0V and $-V_S$ thereby forming quantised voltage pulses to correspond to the quantised voltage pulse width 57.

The noise shaper 46 of FIG. 3*a* is shown in more detail in FIG. 3*b*. As can be seen, the voltage pulse width 44 is passed to a junction 68 where the noise-shaped quantisation error 70 is subtracted. In actual fact, a second-order noise-shaping scheme is used where a weighted fraction of the noise-shaped quantisation error from the last-but-one period is combined with the noise-shaped quantisation error 70 from the previous period before being subtracted. This produces a noise-shaped voltage pulse width 48 that contains a compensation for the additional voltage added or missed due to the quantisation error of the previous periods. The noise-shaped voltage pulse width 48 is then used for generating the switching signals pulse widths 52 that are used in turn to generate the quantised switching signals pulse widths 56 from which the quantised voltage pulse width 57 is deduced as described above.

The quantised voltage pulse width 57 is passed along the feedback loop 58 where it is subtracted from the compensated voltage pulse width 53 at the junction 72 to give the quantisation error 74. Following that, the quantisation error 74 is processed by a noise shaping filter 76 that uses second-order noise-shaping to suppress the quantisation noise across the frequency band of interest, as is well known in the art.

Next, the processed quantisation error 78 produced by the noise shaping filter 76 is passed through a one period delay at 80 to ensure that the processed quantisation error 78 is subtracted from the voltage pulse width 44 for the successive period. Hence, the negative feedback loop is completed.

The voltage sensor system 34 will now be described in more detail with particular reference to FIG. 4. As mentioned above, the supply input to the half-bridge circuit 14 is supplied with a filtered DC supply 22. This is obtained from a DC supply 36 that is passed through a filter 38 to remove as much mains ripple as possible that may be present in the signal from the DC supply 36.

In addition, there will be some intermodulation of the filtered DC supply 22 due to variations in the potential across the reservoir capacitor 26 in the half-bridge circuit 14 as it charges and discharges in response to variations in current flowing through the electromagnet 10. The intermodulation will manifest themselves as an amplitude modulation in the quantised voltage pulses seen by the electromagnet 10. Clearly, deviation from the desired $+V_S$, 0V or $-V_S$ pulse levels will lead to the voltage demand signal 12 not being met and the current flowing through the magnet will drift from that necessary to create the intended magnetic fields (e.g. to isolate vibrations in the moving machinery).

To compensate for unwanted fluctuations in the filtered DC supply 22, a predictive voltage sensor system 34 is used. Signal-processing delays mean that direct feedthrough of fluctuations in the filtered DC supply 22 would arrive at the switching signals generator 28 too late to provide effective compensation. Hence, the feedforward predictive voltage sensor system 34 is used. A voltage sensor 82 measures the filtered DC supply 22 as shown in FIG. 4. The reciprocal of these measurements is calculated at 84 for use by a 7-tap finite impulse response (FIR) filter 86. These components are readily available as will be appreciated by those skilled in the art. The FIR filter 86 is used to predict the likely value of $1/V_S$ across the next period and passes this value as the voltage sensor signal 30 to the switching signals generator 28 such that weight can be added or subtracted to the voltage pulse width 44 proportionate to an expected increase or decrease in voltage respectively.

The quality of control of the electromagnet 10 is also affected by the finite and non-trivial time taken for the voltage seen by the electromagnet 10 to fall upon switching off of one of the transistors 20*a*, 20*b* (among other factors, as will be explained below). The linear decay of the voltage is caused because the voltage can only fall as fast as the current can discharge the capacitance inherent in the electromagnet 10. The current is measured by the current sensor 40, shown in FIG. 2, and the resulting current sensor signal 32 is passed to the switching signal generator 28 so that the switching signals pulse widths 52 can be calculated to compensate for the slow decay in voltage corresponding to the current measured in the previous period.

Now that the components of the current controller have been described, there follows a presentation of the method of operation of the current controller with particular attention being paid to how the widths of the pulses in the voltage seen by the electromagnet 10 and the pulses in the switching signals 24*a*, 24*b* are determined.

Each period begins with a voltage demand 12 being received by the switching signals generator 28 that, in turn, calculates the required switching signals 24*a*, 24*b* that will produce an average voltage across the electromagnet 10 for the period to match the voltage demand 12. The switching signals generator 28 then passes the switching signals 24*a*, 24*b* to the transistors 20*a*, 20*b* respectively, correctly synchronised to the period by reference to a precision timing clock 66.

As can best be seen from FIG. 3*a*, the voltage demand 12 is received by the voltage pulse width generator 42. As mentioned above, the voltage pulse width 44 in seconds is generated assuming that a single pulse of either $+V_S$ or $-V_S$ relative to a baseline of 0V will be used. The voltage pulse width 44 is generated with regard to fluctuations in the filtered DC supply 22, according to a predictive measure of $V_S$ for the period which is supplied as the voltage sensor signal 30 which can be written as $(1/V_S)_{est}$.

Furthermore, account is also taken of the forward voltage drop of the diodes 16 ($V_{diode}$) and the transistors 20*a*, 20*b*. If these effects were not accounted for, an output voltage offset and change in output voltage amplitude would be seen. The voltage drop across the transistors 20*a*, 20*b* is known to vary significantly over typical operating conditions. To estimate the size of the voltage drop, a value of the transistors' 20*a*, 20*b* drain-source resistance ($R_{DS}$) is obtained from the corresponding device data sheet for a representative operating point. This resistance is used in conjunction with the current sensor signal 32 (which gives the current $I_{mag}$ flowing through the electromagnet) to estimate the forward voltage drop of the transistors 20*a*, 20*b*. The value of $V_{diode}$ is assumed to be constant across the operating conditions of the current controller and so is obtained by choosing a value representative of a typical operating point from the corresponding device data sheet.

Finally, a small DC offset voltage correction ($V_{offset}$) is used for fine adjustment of the output voltage: this value is obtained by calibration.

The demanded voltage 12 ($V_{demand}$) is adjusted by the addition of the voltage drops in the diodes 16 and transistors 20*a*, 20*b* and the offset voltage correction, to compensate for those losses (use of positive and negative signs for the offset ensure correct compensation). The required voltage pulse width 44 ($W_{req}$) can hence be calculated from:

$$W_{req} = (V_{demand} + V_{diode} + I_{mag} \cdot R_{DS} + V_{offset}) \cdot \left(\frac{1}{V_S}\right)_{est} \cdot W_{full} \quad \text{equation (1)}$$

where $W_{full}$ is the maximum pulse width in seconds. In this example, a pulse repetition frequency of 64 kHz was used and the frequency of the timing clock was 32.768 MHz giving a period width of 15.625 µs. Of course, other pulse repetition frequencies can be substituted depending on noise demands and expense or availability of components to cope with higher frequencies.

It will be noted from equation (1) that the voltage pulse width 44 will carry a sign reflecting the polarity of the voltage demanded, i.e. it will be positive for voltage demands 12 in the range 0V to $+V_S$ and negative for voltage demands 12 in the range 0V to $-V_S$. This sign is carried throughout the subsequent calculations. Furthermore, the voltage pulse width 44 is a measure of the time away from the 0V base line and hence is the width of the pulse at $+V_S$ and the pulse at $-V_S$.

Whilst equation (1) leads to a high level of accuracy, not all or any of the terms contained in the first set of brackets (other than $V_{demand}$) need be included where a reduction in the performance of the electromagnet can be tolerated.

The voltage pulse width 44 is then passed to the noise shaper system 46 to produce a noise-shaped voltage pulse width 48 ($W_{sh}$). This is calculated with reference to the quantisation error in the width of the previous period's pulse ($W_{QE-1}$) and also with reference to the quantisation error in the width of the last-but-one period's pulse ($W_{QE-2}$) as mentioned above. The noise-shaped voltage pulse width 48 is given by:

$$W_{sh} = W_{req} - 2\cos\left(\frac{2\pi \cdot f_{notch}}{f_{PRF}}\right) \cdot W_{QE-1} + W_{QE-2}$$

where $f_{PRF}$ is the pulse repetition frequency (64 kHz, as mentioned above) and where $f_{notch}$ is the chosen frequency for the inevitable notch in the noise spectrum of the shaped noise. In the present embodiment, this was chosen to be 1 kHz.

The noise-shaped voltage pulse width 48 is then passed to the switching signals pulse width generator 50 that generates the corresponding widths for the pulses in the switching signals 24*a*, 24*b*. However, there are four modes of switching the transistors 20*a*, 20*b* and the correct mode must be implemented. Accordingly, these four modes are now detailed with reference to FIGS. 5*a–d*. To summarise what has been discussed previously in this respect, the following voltages are seen by the electromagnet 10 when the transistors 20*a*, 20*b* are switched as follows:

| transistor states | voltage |
|---|---|
| both on | $+V_s$ |
| one on, one off | 0 V |
| both off | $-V_s$ |

Figure 5A:
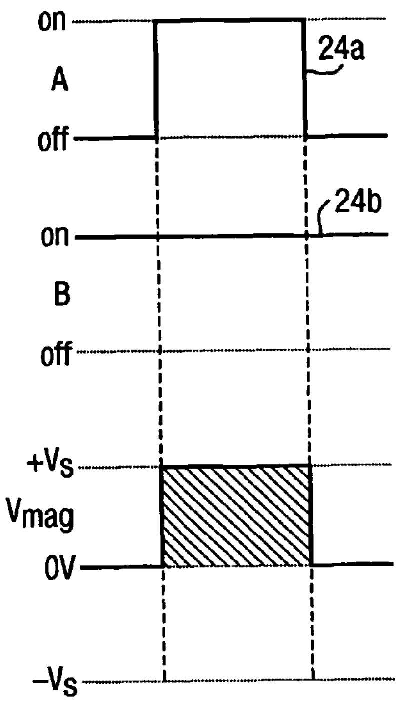

FIG. 5*a* shows the switching sequence where the voltage demand 12 is for a positive voltage, i.e. in the range of 0 to $+V_S$. To avoid the power losses inherent in each switching operation of either transistor 20*a*, 20*b*, the default switching mode is a so-called 'class B' mode where only one transistor 20*a* is switched during a period whilst the other transistor 20*b* is left in its on state throughout the period. In this way, no power is lost in transistor 20*b* due to switching. In addition, in many types of application the voltage demand 12 is likely to remain positive or negative for many successive periods so that one transistor 20*a*, 20*b* can be left in a steady state over those periods thereby avoiding any power loss inherent in switching that transistor 20*a*, 20*b*. As can be seen, a single pulse in switching signal 24*a* is generated centrally within the period to provide a voltage across the electromagnet 10 with a single corresponding pulse of $+V_S$ (hatched in FIG. 5*a*) rising from a baseline of 0V to give the demanded positive voltage.

Figure 5B:
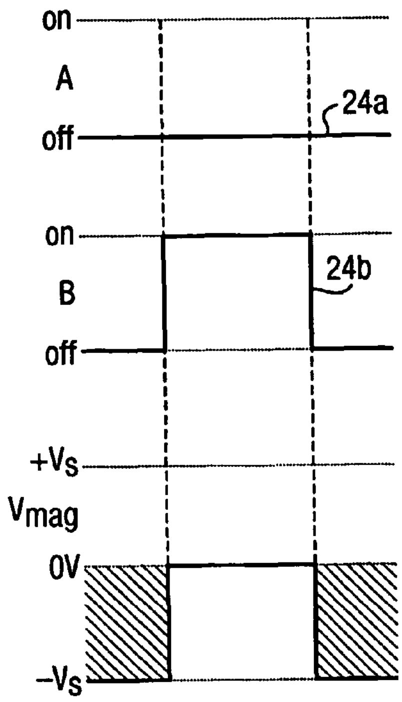

FIG. 5*b* shows a second mode of operation corresponding to a voltage demand 12 for a negative voltage, i.e. in the range of 0 to $-V_S$. Again, class B switching of the transistors 20*a*, 20*b* is used, this time with transistor 20*a* being left in an off state throughout the period and transistor 20*b* being switched with its switching signal 24*b* having a central pulse within the period. The resulting voltage seen by the electromagnet 10 has a pair of $-V_S$ pulses extending from the 0V baseline at the beginning and end of the period. Hence, the two pulses hatched in FIG. 5*b* combine to form the required negative voltage pulse. Therefore it is not the central pulse of switching signal 20*b* that gives the $-V_S$ pulse, but rather the peripheral regions. Accordingly, it is the full width of the period less the width of the central pulse in the switching signal 24*b* that corresponds to the width of the $-V_S$ pulse in the voltage seen by the electromagnet 10. It will be appreciated that, as above, a transistor (20*a* in this case) can be left in a steady state where successive negative voltages are demanded.

Strictly speaking, a further mode ought to be mentioned for the sake of completeness, namely that arising when a zero voltage is demanded. This can be implemented by leaving transistors 20*a* off and 20*b* on throughout the period.

Whilst class B switching is preferred due to the reduction in power losses in having to switch both transistors 20*a* and 20*b* within a period, a conflicting demand arises where small positive or small negative voltages are demanded. In the case of a small positive voltage, this leads to a narrow pulse in the voltage seen by the electromagnet 10 such that the voltage must rapidly step up to $+V_S$ then down to 0V. In the case of a small negative voltage, the problem lies in the start and end of successive periods where the voltage must rapidly step down to $-V_S$ then up to 0V. Slow response of the transistors 20*a*, 20*b* and ringing adds distortion to the square edges of the pulses leading to a lack of voltage control. These effects become problematic for a characteristic small pulse width where the steady flat region between ringing waveforms is lost. This leads to a loss of linearity in the current controller. To overcome this problem, a threshold pulse width $W_{thresh}$ is set and when a pulse width below this is required to meet a voltage demand 12, switching changes to so-called 'class AB' mode where both transistors 20*a*, 20*b* are switched in a period.

Figure 5C:
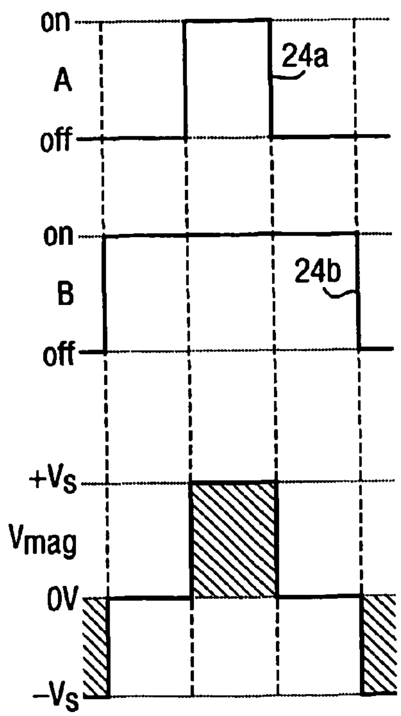

FIG. 5*c* shows a case of class AB switching for a small positive voltage demand 12. If implemented using class B switching, a single pulse in the voltage seen by the electromagnet 10 would arise that is below the threshold width. To avoid this, the transistor 20*a* is switched to produce a central on pulse with a width equal to the threshold width plus the demanded width and, rather than leaving the transistor 20*b* in its on state throughout the period, it is switched to produce a central on pulse occupying most of the period. The resulting potential seen by the electromagnet 10 starts and ends with a small downwardly-extending pulses at $-V_S$ where both transistors 20*a*, 20*b* are off (indicated by the unbroken hatched areas) which steps to regions at 0V where transistor 20*b* is on and transistor 20*a* is off, these regions meeting at a central pulse at $+V_S$ where both transistors 20*a*, 20*b* are on (indicated by the broken hatched area). The widths of the hatched areas have been exaggerated for the sake of clarity and should not be used to gauge actual threshold widths. The average potential seen by the electromagnet 10 over the period corresponds to the broken hatched area less the unbroken hatched areas which clearly results in a net small positive voltage.

Figure 5D:
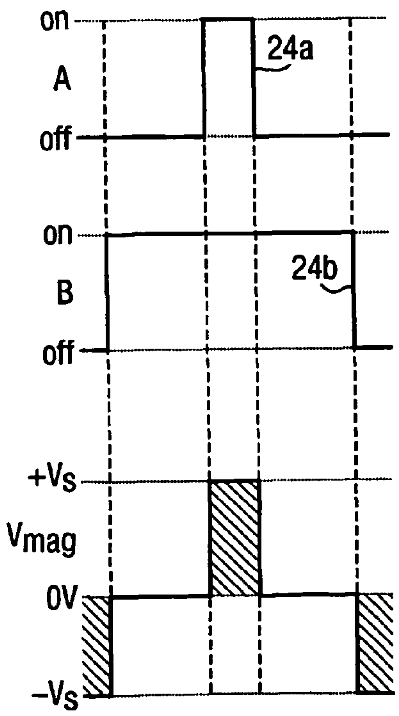

In a similar vein, FIG. 5*d* shows the case of class AB switching in response to a small negative voltage demand 12 that, if class B switching were to be used, would result in a width of the $-V_S$ pulse between successive periods that is below the threshold width. To maintain the minimum $-V_S$ pulse width, transistor 20*b* is switched to have an on pulse extending centrally over most of the period. Transistor 20*a*, rather than being left in an off state as in class B switching, is switched to have a central on pulse. The resulting potential seen by the electromagnet 10 has a shape corresponding to that described above with reference to FIG. 5*c*, except that now the unbroken hatched areas corresponding to $-V_S$ combine to be larger than the broken hatched area corresponding to $+V_S$, hence resulting in the electromagnet seeing a small negative average potential.

Accordingly, the type of switching mode is determined by testing the following conditions:

$$W_{sh} \geqq 0 \text{ condition} \quad (1)$$

$$|W_{sh}| - W_{cap} \geqq W_{thresh} \text{ condition} \quad (2)$$

where $W_{cap}$ is a width adjustment calculated to compensate for capacitance in the electromagnet 10 ($C_{mag}$). This capacitance causes slow rise and fall times between the voltage levels seen by the electromagnet 10, as mentioned above, and so has the effect of artificially lengthening the pulses. Hence, control is lost. The width adjustment is calculated from:

$$W_{cap} = \frac{C_{mag}}{2\text{MAX}\{I_{mag}, I_{\min}\}}$$

where the largest of the current through the electromagnet 10 ($I_{mag}$) or a minimum current value ($I_{min}$) is used. The minimum current value corresponds to a lower limit of current used in this calculation to avoid dividing by zero and other problems encountered where only small currents flow through the electromagnet 10.

The type of switching appropriate for the outcome of testing conditions (1) and (2) is presented below:

| condition (1) | condition (2) | switching mode | illustrated in |
|---|---|---|---|
| yes | yes | +class B | FIG. 5a |
| no | yes | −class B | FIG. 5b |
| yes | no | +class AB | FIG. 5c |
| no | no | −class AB | FIG. 5d |

The switching signal pulse widths 52 are then calculated for the appropriate switching modes as follows. In the equations below, $W_A$ and $W_B$ are the widths of the pulses of switching signals 24*a* and 24*b* respectively. $W_{EA}$ and $W_{EB}$ are the net effective errors in the actual width of the pulses generated in response to the switching signals 24*a* and 24*b* respectively (the values are determined through calibration). $W_{min}$ is a fixed offset to be added when in class AB mode.

+class B $$W_A=|W_{sh}|-W_{cap}-W_{EA}$$

$$W_B=W_{full}$$

i.e. transistor 20*a* has a pulse of the noise shaped voltage pulse width 48 less compensation for capacitance and net effective errors, whilst transistor 20*b* remains on throughout the period.

−class B $$W_A=0$$

$$W_B=W_{full}-|W_{sh}|-W_{cap}-W_{EB}$$

i.e. transistor 20*a* remains off throughout the period, whilst transistor 20*b* has a central pulse equal to the full period width less the noise shaped voltage pulse width 48 (remembering that the noise shaped voltage pulse width 48 reflects the voltage pulse width at $-V_S$ whereas we are now setting a width for a pulse in the switching signal generating the central region at 0V) and also less compensation for capacitance and net effective errors.

+class AB $$W_A=|W_{sh}|+(W_{min}+W_{cap})-W_{cap}-W_{EA}$$

$$W_B=W_{full}-(W_{min}+W_{cap})-W_{cap}-W_{EB}$$

i.e. transistor 20*a* has a pulse of the noise shaped voltage pulse width 48 plus the fixed offset to ensure the threshold width is exceeded less compensation for capacitance and net effective errors, whilst transistor 20*b* remains on throughout the period less the fixed offset to ensure no net gain in output voltage across the electromagnet 10 and less compensation for capacitance and net effective errors.

−class AB $$W_A=(W_{min}+W_{cap})-W_{cap}-W_{EA}$$

$$W_B=W_{full}-|W_{sh}|-(W_{min}+W_{cap})-W_{cap}-W_{EB}$$

i.e. similar to the case of −class B switching, but now transistor 20*a* contains a pulse with the fixed offset width less compensation for capacitance and net effective errors, whilst transistor 20*b* has a reduction in width in its central pulse corresponding to the fixed offset to ensure a minimum gap between voltage changes between periods.

The switching signals pulse widths 52 have now been calculated, but these widths 52 are in seconds and can take any value in the range of 0 s to the full width of the period (the reciprocal of the pulse repetition frequency, i.e. 15.625 μs). However, as the final switching signals are pulse width modulated, the switching signals pulse widths 52 must be converted to cycle counts of the precision timing clock 66 such that they are quantised to match the number of available cycle counts in one period (it has been noted above that the combination of pulse repetition frequency and precision timing clock 66 frequency $f_{clock}$ gives 512 cycle counts per period). This function is performed by the switching signals pulse width quantiser 54.

The switching signals pulse width quantiser 54 calculates the number of cycle counts ($N_A$ and $N_B$ for transistors 20*a* and 20*b* respectively) from the simple formulae below and passes these values on as the quantised switching signals pulse widths 56.

$$N_A=|\text{round}(f_{clock}\cdot W_A)|$$

$$N_B=|\text{round}(f_{clock}\cdot W_B)|$$

$N_A$ and $N_B$ are also used to calculate the quantisation error 74 ($W_{QE}$) according to the formula:

$$W_{QE}=\left(\frac{N_A}{f_{clock}}-W_A\right)+\left(\frac{N_B}{f_{clock}}-W_B\right)$$

$W_{QE}$ is then used as $W_{QE-1}$ and $W_{QE-2}$ in following periods, as described above.

With the quantised switching signals pulse widths 56 known in units of cycle counts of the precision timing clock 66, the switching signals edge position generator 60 generates the precise cycle counts where the edges of the pulses of the switching signals 24*a*, 24*b* will occur.

The pulses are positioned using alternate-odd-asymmetry in order to minimise signal distortion. This distortion arises from where pulses of an odd number of cycle counts are needed. Such pulses cannot be positioned centrally within the period given the constraint that the edges must coincide with the start and end of cycle counts. If the pulses were always positioned to be half a cycle early or half a cycle late, distortion would result. This distortion is minimised by using alternate odd asymmetry, i.e. by alternating the offset between the leading and trailing edge halves of the period. Put into algorithms, the on edge position and off edge positions for transistor 20*a* are given by:

| | |
|---|---|
| if $N_A$ is even then: | $ON_A = ½(N_{full} - N_A)$ |
| else: | $ON_A = ½(N_{full} - N_A + d_A)$ and $d_A = -d_A$ |
| and: | $OFF_A = ON_A + N_A$ |

where $N_{full}$ is the maximum number of cycle counts (512) and $d_A$ is initially set to +1 and its value is carried through from one period to the next. As will be appreciated, the edge positions for transistor 20*b* are determined in corresponding fashion (i.e. with the 'A' subscripts swapped for 'B' subscripts).

With the edge positions of the pulses in the switching signals 24*a*, 24*b* known, these values are passed to the switching signals generator 64 as the switching signals edge positions 62. The switching signals generator 64 then synchronises the switching signals edge positions 62 to the cycle counts of the precision timing clock 66 to produce the actual switching signals 24*a*, 24*b* which are then passed to the transistors 20*a*, 20*b* respectively.

Hence, the half-bridge circuit 14 is operated to produce an average voltage across the electromagnet 10 corresponding to the voltage demand 12.

The person skilled in the art will appreciate that modifications can be made to the embodiments described hereinabove without departing from the scope of the invention.

For example, the above embodiment describes a current controller that supplies current to the electromagnet 10 in response to a voltage demand signal 12 that may be generated in accordance with a desired force by a global controller. However, the current controller may operate in response to a current demand signal 88 rather than a voltage demand signal 12. This signal may be generated by the global controller in much the same way as described with respect to generation of the voltage demand signal 12 of the first embodiment.

Such an arrangement is shown in FIG. 6: this Figure is equivalent to FIG. 2 but shows the additional elements required to operate in a current demand mode. Whilst all elements from FIG. 2 (and those shown in detail in FIGS. 3 and 4) would be included in the current controller, only those relevant to this discussion of the current demand mode are shown in FIG. 6 for the sake of clarity. As will be evident, the major change is the inclusion of a control loop indicated generally at 87.

In one mode of operation, current demand signal 88 (labelled as 88*a* for the sake of clarity) is compared with the current sensor signal 32 at a comparator 90. The current sensor signal 32 is derived from the output of the current sensor 40 and provides a measure of the current passing through the electromagnet 10. Comparing the current sensor signal 32 with the current demand signal 88*a* provides an error signal 92 that represents deviation in current through the electromagnet 10 away from the demanded current. The error signal 92 is passed to a filter 94 that incorporates control loop gain, a control loop filter and a current-to-voltage transfer model to produce voltage demand signal 12*a*. The voltage demand signal 12*a* is passed to the switching signals generator system 28 via a three-way switch 96.

Inaccuracies in the current-to-voltage transfer model are compensated by the control loop 87 using the current sensor 40. The performance of the current controller is dependent more on the noise performance and accuracy of the current sensor 40 than the accuracy of the current-to-voltage transfer model. If necessary, a combination of current sensors may be used, to give the best dynamic range for example.

In an alternative mode of operation where the control loop 87 that compensates for drifts in electromagnet current (via current sensor signal 32) is not required, the current demand signal 88 can be passed directly at 88*b* to a voltage demand generator 100, as shown in FIG. 6. The voltage demand generator 100 generates the voltage demand signal 12*b* by using a filter containing a model of the electromagnet load characteristic so that the voltage demand generator 100 can predict the appropriate voltage demand necessary to produce the required current demand 88. The voltage demand signal 12*b* is passed to the switching signals generator system 28 via a three-way switch 96. Of course, the accuracy of the eventual current passed to the electromagnet 10 is heavily dependent upon the accuracy of the load model generating the voltage demand signal 12*b*.

If desired, the current controller can be adapted to operate in either voltage demand or current demand mode. For example, the three-way switch 96 could be used to switch between the voltage demand input 12*a* provided by the filter 94 or the voltage demand input 12*b* provided by the voltage demand generator 100 or a direct voltage demand input 12*c* (i.e. a line carrying a voltage demand direct from a global controller or similar) to produce the voltage demand signal 12 passed to the switching signals generator system 28.

The invention claimed is:

1. A method of operating a bridge circuit comprising an input that receives a direct current (DC) supply of nominal voltage $+V_S$, an output having an electromagnet connected thereacross, first and second arms having first and second switches, respectively, the first and second arms being connected to opposed ends of the electromagnet, the method comprising the steps of:

(a) receiving a voltage demand signal indicative of a desired voltage of an electrical signal to be supplied to the electromagnet in a period;

(b) generating first and second switching signals with reference to the voltage demand signal; and (c) applying the first and second switching signals to the first and second switches, respectively, during the period;

wherein the switching signals cause the switches to switch between on and off states, switching between various combinations of on and off states of the first and second switches producing an electrical signal across the electromagnet with voltage pulses at levels of nominally $+V_S$, 0V and $-V_S$, the first and second switching signals being generated such that an average voltage of the electrical signal supplied to the electromagnet during the period is substantially equal to the desired voltage.

2. The method of claim 1 comprising the step of generating pulsed first and second switching signals.

3. The method of claim 2 comprising the step of generating the first and second switching signals according to a rule that the first and second switches are not switched concurrently.

4. The method of claim 2 comprising the step of generating the first and second switching signals according to a rule that the signals are to have no more than one pulse per period.

5. The method of claim 4 comprising the step of generating the first and second switching signals according to a rule that any pulse should be positioned substantially symmetrically about the centre of the period.

6. The method of claim 5 comprising the step of generating the first and second switching signals according to the rule that where pulses cannot be centred symmetrically, the longer and shorter sides of the asymmetric pulses are alternated between the leading edge side and the trailing edge side for successive pulses.

7. The method of claim 2 comprising the step of generating the first and second switching signals according to a pulse width modulation scheme.

8. The method of claim 7 comprising the step of generating the first and second switching signals according to a rule that the first switching signal should remain in one state throughout a period and the second switching signal contains a pulse such that the first switch remains in one state throughout a period and the second switch is switched between on and off states during the period.

9. The method of claim 8 comprising the step of generating the first and second switching signals according to a rule that the pulse widths of the resulting voltages across the electromagnet must not fall below a minimum pulse width.

10. The method of claim 9 comprising the step of generating the first and second switching signals according to a rule that pulse widths below the minimum pulse width are avoided by departing from the rule that one of the first or second switches should remain in one state throughout a period with the other of the first and second switches being switched between on and off states during the period, in favour of a rule that both first and second switching signals contain a pulse such that both the first and second switches are switched between on and off states during a period.

11. The method of claim 10 comprising the step of adjusting the width of the pulse of the first switching signal by an amount that is equal but compensatory of an adjustment made to the width of the pulse of the second switching signal.

12. The method of claim 8, wherein the width of a pulse of the first and/or second switching signals is generated with reference to a voltage signal indicative of the DC supply voltage such that the width of the pulse compensates for fluctuations in the DC supply.

13. The method of claim 12, wherein the voltage signal is passed through a filter to obtain a predictive measure of fluctuations in the DC supply.

14. The method of claim 13, wherein the voltage signal is passed through a finite impulse response filter.

15. The method of claim 8, wherein a pulse of the first or second switching signals is generated to include an adjustment to the width of the pulse to compensate for a voltage drop across a diode and/or transistor in the switching circuit.

16. The method of claim 15, wherein the adjustment to the pulse width is calculated with reference to a current signal indicative of the current flowing through the output and to a representative resistance of the diode or transistor.

17. The method of claim 8, wherein a pulse of the first or second switching signals is generated to include an adjustment to the width of the pulse to compensate for a voltage offset caused by a slow response in generating the first or second switching signals.

18. The method of claim 2 further comprising the step of noise shaping the first and second switching signals.

19. The method of claim 1 wherein the first and second switches are transistors and the method comprises the step of switching the transistors between on and off states corresponding to substantially minimum voltage drop and substantially minimum current flow respectively through the transistors.

20. The method of claim 1 comprising the step of receiving a current demand signal indicative of a desired current to be supplied to the electromagnet in a period and determining the voltage demand signal indicative of a desired voltage of an electrical signal to be applied to the electromagnet that results in the electrical signal being supplied to the electromagnet during the period with a current substantially equal to the desired current.

21. The method of claim 20, wherein the step of calculating the voltage demand signal is performed with reference to a model of the load characteristic of the electromagnet.

22. The method of claim 20 further comprising the step of generating the voltage demand signal with reference to a current signal indicative of the current flowing through the output.

23. A computer program comprising program code means for performing the method steps of claim 1 when the program is run on a computer and/or other processing means associated with the bridge circuit.

24. A computer program product comprising program code means stored on a computer readable medium for performing the method steps of claim 1 when the program is run on a computer and/or other processing means associated with the bridge circuit.

25. A bridge circuit comprising an input operable to receive a DC supply of nominal voltage $+V_S$, an output having an electromagnet connected thereacross, first and second arms having first and second switches respectively, the first and second arms being connected to opposed ends of the electromagnet and processing means programmed to perform the method step of claim 1.

26. A bridge circuit according to claim 25, further comprising a noise shaper operable to noise-shape the first and second switching signals.

27. A bridge circuit according to claim 25, further comprising voltage signal sensor operable to produce a voltage signal, further comprising a filter arranged to receive the voltage signal.

28. A bridge circuit according to claim 27, wherein the filter is a finite impulse response filter.

* * * * *